March 9, 1948.    E. B. WHITE    2,437,575
STEERING DEVICE
Filed April 12, 1946    2 Sheets-Sheet 1

INVENTOR.
BY  Eber B. White
ATTORNEYS.

March 9, 1948.　　　　E. B. WHITE　　　　2,437,575
STEERING DEVICE
Filed April 12, 1946　　　2 Sheets-Sheet 2

INVENTOR
Eber B. White
BY
Brown, Jackson, Boettcher & Dienner
ATTORNEY

Patented Mar. 9, 1948

2,437,575

UNITED STATES PATENT OFFICE 2,437,575

STEERING DEVICE

Eber B. White, South Bend, Ind., assignor to The Studebaker Corporation, South Bend, Ind., a corporation of Delaware Application April 12, 1946, Serial No. 661,621

3 Claims. (Cl. 74—557)

This invention relates, generally, to a device whereby an operating wheel may be turned by a person having a prosthetic substitute for a natural hand, and it has particular relation to a steering aid to be attached to steering wheels for use by persons having such prosthetic substitutes.

Although a need for steering aids of this type has long existed, such need has recently become acute because of the large number of veterans who have suffered the loss of one or both hands, and who have been fitted with prosthetic substitutes.

It is preferable to provide a steering aid which may be readily attached to conventional steering wheels for use by such handicapped persons, rather than provide substitute steering wheels especially designed for their use. Such especially designed steering wheels would be expensive and would be inconvenient for use by drivers having their natural hands. Furthermore, since most automobiles are habitually driven by several members of the family, it is desirable that any steering aid for use by a person having an artificial hand or hook, cause as little interference as possible with the use of the steering wheel by a person having his natural hands.

Steering aids of this general type, for attachment to ordinary steering wheels, have been provided heretofore. The primary object of this invention, generally stated, is the provision of such a steering aid which may alternately be locked in an operative position for use by a person having a prosthetic substitute for a natural hand, and which may be locked in an out of the way position when the steering wheel is handled by a driver having his natural hands, so as to interfere as little as possible with normal usage by drivers having natural hands.

Other, and more specific, objects of the invention will, in part, be obvious and will in part appear hereinafter.

For a more complete understanding of the nature and scope of the invention, reference may be had to the following detailed description thereof, taken in connection with the accompanying drawings wherein.

Figure 1:
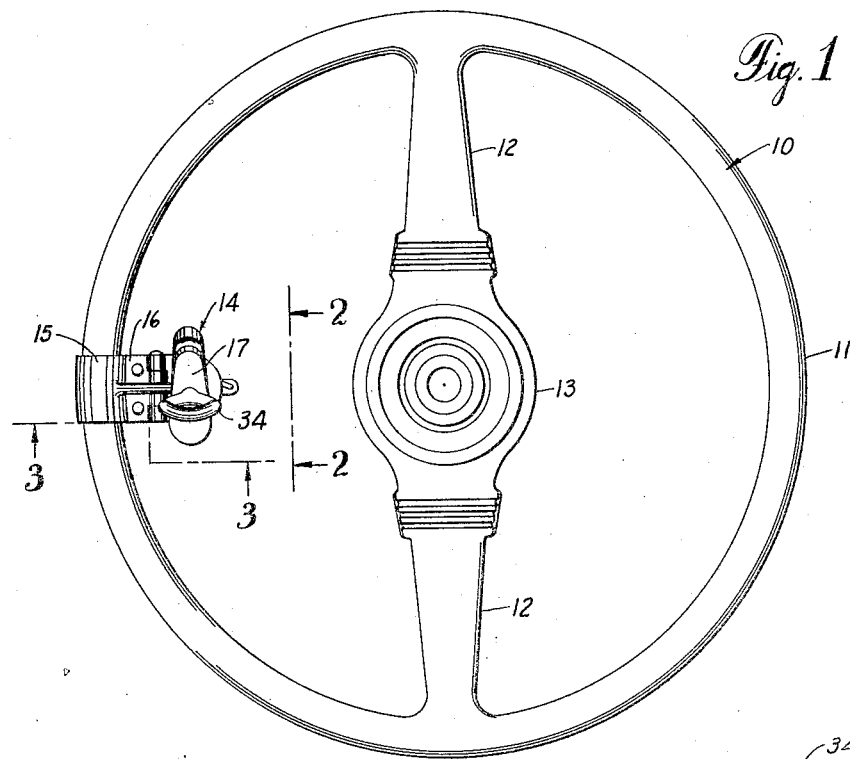
Figure 1 is a top plan view of a conventional automobile steering wheel having a steering aid, forming one embodiment of this invention, attached thereto and in a position for use by a driver having a prosthetic appliance.
Figures 2, 3:
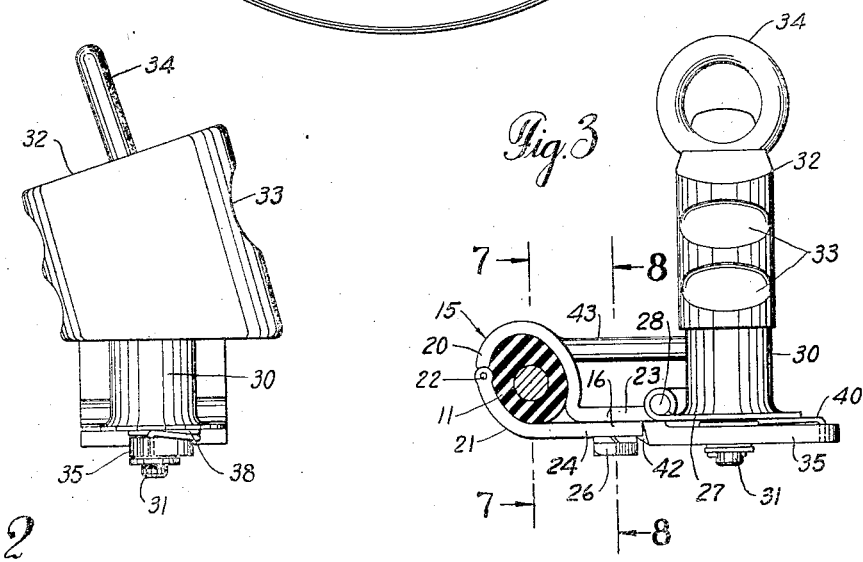
Figure 2 is a side elevational view of the steering aid taken from the right hand side as it is shown in Figure 1.
Figure 3 is a rear elevational view of the steering aid as shown in Figure 1 with the ring section of the steering wheel shown in cross section.
Figure 4:
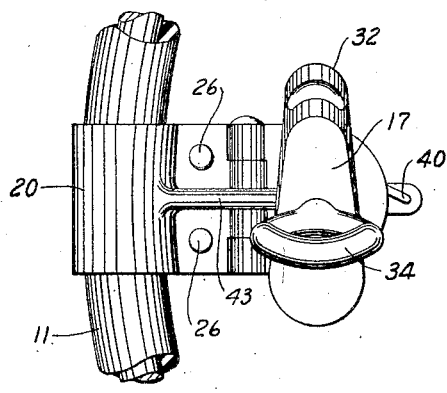
Figure 4 is an enlarged top plan view of the steering aid as shown in Figure 1.

Referring first to Figure 1 of the drawings, a conventional automobile steering wheel is shown generally at 10 having a ring section 11 supported by a pair of spokes 12 from a hub 13. A steering aid, illustrating one embodiment of this invention, and designated generally at 14, is attached to the ring 11.

The steering aid 14 includes a two-part bracket 15 providing a bracket arm 16 which projects into the interior area of the wheel 10. As will be described in detail below, the bracket 15 supports an operating handle 17 adapted to be engaged in force transmitting relationship by a prosthetic appliance whereby the wheel 10 may be turned as desired.

The details of construction of the steering aid 14 are shown more clearly in Figures 2 through 6. The bracket 15 is made in two parts 20 and 21 which are hinged together at 22. The upper part 20 and the lower part 21 are so formed as to provide both a clamp around the ring 11 (Figure 3), and the bracket arm 16. As shown in Figure 7, the lower part 21 is provided with formations on its inner surface so as to interfit with the grip formations on the underside of ring 11. This arrangement serves to more firmly clamp bracket 15 to the wheel. The bracket arm 16 consists of opposing flat sections 23 and 24 which the member 23 is part of a second hinge. The pair of screws 26 serve to secure the sections 23 and 24 together.

The second hinge is indicated at 27, and is adapted to rotate or swing around the hinge rod 28. It will be noted that the axis of the rod 28 lies in a plane generally parallel to that of the steering wheel 10.

A handle support member 30 for the handle 17, is integrally supported on the swinging section 27 of the hinge. The member 30 is in the form of a relatively short cylinder provided with a central hole extending therethrough. The handle 17 is rotatably secured to the support member 30 by means of a rod 31 extending and projecting through the hole therein.

The handle 17 comprises a flat solid member 32 provided with notches 33 in the front and back, and an eye 34 carried on the top thereof. The eye 34 is adapted for engagement by the hook type of prosthetic appliance, while the grip 32 is adapted for engagement by the molded hand form of prosthetic appliance.

Figure 5:
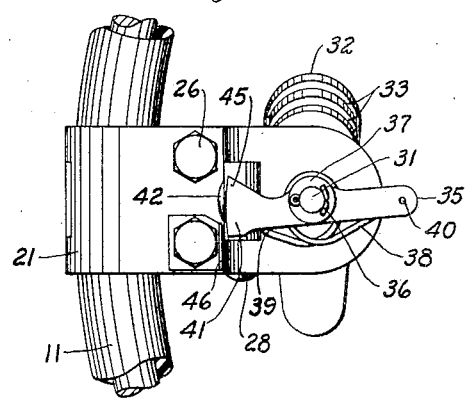
Figure 5 is a bottom plan view of the steering aid as shown in Figure 1.
Figure 6:
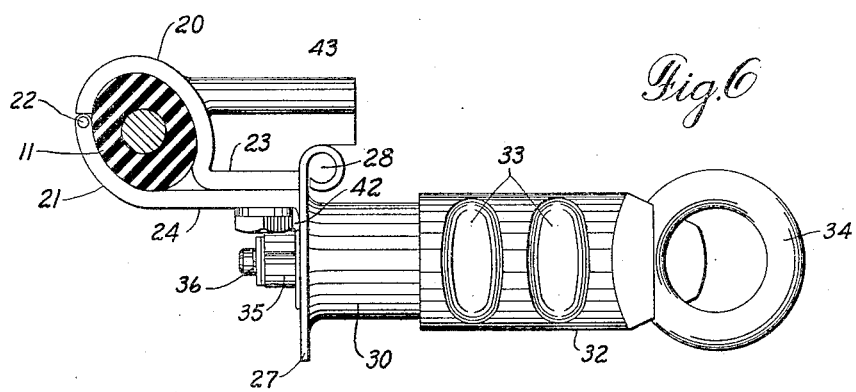
Figure 6 is a rear elevational view similar to Figure 3, but with the steering aid in its out of the way, non-operative position.
Figure 7:
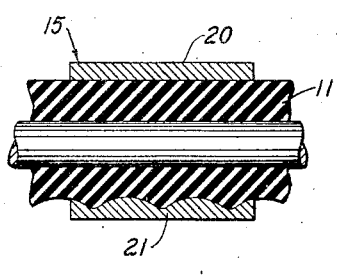
Figure 7 is an enlarged sectional view taken on line 7—7 of Figure 3.
Figure 8:
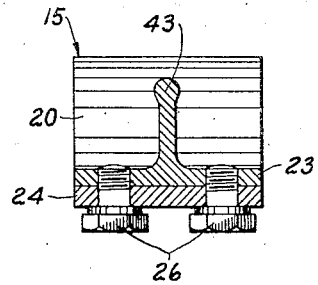
Figure 8 is a sectional view taken on line 8—8 of Figure 3.

In addition to the foregoing structure, locking means are provided for alternately locking the handle 17 either in the position shown in Figures 1 through 5, or in the out of the way position shown in Figure 6. The desirability of putting the handle 17 out of the way when a driver with natural hands is using the wheel 10, is obvious. Otherwise, the steering aid 14 would be in the way and be a nuisance much of the time. However, in the out of the way position shown in Figure 6, the steering wheel 10 may be handled in normal fashion with hardly any interference from the steering aid 14.

An important element of the locking means is a latch 35 carried underneath the hinge section 27 and rotatably secured on the pin 31. A cotter pin 36 (Figure 5) and washer 37 securely hold the latch 35 in position.

In order to rotate and bias the latch 35 in a clockwise direction as viewed in Figure 5, a coil spring 38 is provided having one end 39 secured to the hinge section 27 with the other end 40 (Figures 3 and 4) secured to the projecting end of the latch 35.

The latch 35 has its ends 41 cam shaped so as to engage a stop 42 (Figures 3 and 5) integrally carried beneath the bracket section 24. The cam end 41 and stop 42 are so shaped that when the arm 17 is in the upright, operative position, the spring 38, retains the end 41 in engagement with the stop 42 and downward swinging of the hinge 27 and handle 17 is thereby prevented.

When the handle 17 is in the upright position, further upward swinging of the hinge 27, and the handle 17, is prevented by a stop 43 integrally carried on the upper bracket section 20 and adapted to engage the support member 30, as shown in Figures 1 through 5.

The latch 35 may be manually released from the locking position shown in Figure 5 by rotating it in a counterclockwise direction thereby removing the end 41 from engagement with the stop 42. Upon such release, the hinge 27 and the handle 17 carried therewith, is free to turn downwardly to the position shown in Figure 6 of the drawing. In this position the hinge section 27 bears against the stop 42 and prevents further downward swinging. At the same time the tip portion of the cam end 41 indicated at 45 in Figure 5, engages behind a downwardly extending projection 46 (Figure 5) carried beneath one of the outer corners of the lower bracket member 24. By means of this engagement of tip 45 with projection 46, the handle 17 is locked in the out of the way position shown in Figure 6. Again, by manually rotating the latch 35, it may be released from the locking position of Figure 6 and thereby permit the handle 17 to be swung upwardly.

It will be apparent that certain changes in the details of construction of the foregoing embodment of the invention may be made, and that the invention may be provided in other embodiments. Accordingly, it is intended that the foregoing detailed description shall be interpreted as illustrative and not in a limiting sense.

I claim:

1. For combination with a steering wheel, the ring section of which is provided on the underside with finger grip formations; a steering aid for use by persons having prosthetic substitutes for natural hands, comprising a two part bracket having an upper part and a lower part so shaped as to form a clamp for attachment to the ring of said steering wheel and a bracket arm projecting into the interior of said wheel, the ring clamping portion of said lower part of the bracket being provided with conformations interfitting in complementary engagement with said finger grip formations on the underside of said steering wheel ring, means for securing together said two parts of the bracket in clamping engagement on the ring of the wheel, a two part hinge having one part stationarily secured to said bracket arm and the other part adapted to swing about an axis within and parallel to the plane of said steering wheel, a handle support member carried on said swingable part of said hinge, a handle adapted to be engaged in force transmitting relationship by one of said prosthetic substitutes, means rotatably securing said handle to said handle support whereby the handle may rotate thereon about an axis lying in plane generally perpendicular to that of said steering wheel, and spring biased handle locking means operatively interconnected between said bracket and said handle support for alternately locking said handle either in an upstanding operative position where its axis of rotation is perpendicular to the plane of the wheel or in an out of the way position wherein the axis of rotation lies within the plane of said wheel.

2. For combination with a steering wheel; a steering aid for use by persons having prosthetic substitutes for natural hands, comprising, a bracket secured to the ring of said steering wheel having a bracket arm projecting into the interior of said wheel, a hinge member hinged to said bracket arm and adapted to swing about an axis within and parallel to the plane of said steering wheel, a handle support member carried on said swingable hinge member, a handle adapted to be engaged in force transmitting relationship by one of said prosthetic substitutes, means securing said handle to said handle support, a latch rotatably secured to said handle support member, a spring fixedly secured at one end to said support member and at the other end to said rotatable latch whereby the latter is biased in one direction, a first stop carried by and underneath said bracket arm and adapted to be engaged by said latch in one locking position whereby the latch is held thereagainst by said spring so as to prevent downward rotation of said hinge member, a second stop carried by and above said bracket arm adapted to engage said handle support when said handle is in said operative position so as to prevent upward rotation of said hinge member, and means on said bracket arm adapted to be engaged by said latch in another locking position when said handle is in said out of the way position, whereby said swinging part of said hinge is prevented from swinging about its axis, said latch being manually operable to release it from said locking positions.

3. A handle for a steering aid adapted for use by persons having prosthetic substitutes for natural hands, which comprises, a grip block of flattened shape having finger grip formations in the front and back thereof, and an eye ring carried on the top thereof.

EBER B. WHITE.

REFERENCES CITED

The following references are of record in the file of this patent:

UNITED STATES PATENTS

| Number | Name | Date |
|---|---|---|
| 1,314,995 | Whigam | Sept. 2, 1919 |
| 1,866,111 | Jones | July 5, 1932 |
| 2,139,546 | Hansen | Dec. 6, 1938 |

FOREIGN PATENTS

| Number | Country | Date |
|---|---|---|
| 519,369 | Great Britain | Mar. 26, 1940 |